United States Patent
Herrmann

(10) Patent No.: US 9,441,738 B2
(45) Date of Patent: Sep. 13, 2016

(54) ROTARY SLIDE VALVE

(71) Applicant: Buerkert Werke GmbH, Ingelfingen (DE)

(72) Inventor: Markus Herrmann, Oehringen (DE)

(73) Assignee: Buerkert Werke GmbH, Ingelfingen (DE)

( * ) Notice: Subject to any disclaimer, the term of this patent is extended or adjusted under 35 U.S.C. 154(b) by 46 days.

(21) Appl. No.: 14/475,381

(22) Filed: Sep. 2, 2014

(65) Prior Publication Data

US 2015/0060712 A1 Mar. 5, 2015

(30) Foreign Application Priority Data

Sep. 3, 2013 (DE) .................... 20 2013 103 967 U

(51) Int. Cl.
*F16K 3/08* (2006.01)
*F16K 3/10* (2006.01)

(52) U.S. Cl.
CPC ................. *F16K 3/085* (2013.01); *F16K 3/08* (2013.01); *F16K 3/10* (2013.01)

(58) Field of Classification Search
CPC ........ F16K 3/08; F16K 3/085; F16K 27/045; F16K 3/04
USPC .................................................. 251/205, 208
See application file for complete search history.

(56) References Cited

U.S. PATENT DOCUMENTS

| | | | |
|---|---|---|---|
| 4,637,420 A | 1/1987 | Dyer | |
| 4,962,912 A | 10/1990 | Stoll | |
| 5,150,737 A * | 9/1992 | Clerc | 137/625.3 |
| 5,518,027 A * | 5/1996 | Saiki | F16K 11/0782 137/550 |
| 5,664,761 A | 9/1997 | Weyand et al. | |
| 2003/0010950 A1 | 1/2003 | Schiavone et al. | |

FOREIGN PATENT DOCUMENTS

| | | |
|---|---|---|
| CH | 88 614 A | 10/1921 |
| DE | 23 17 948 A | 10/1973 |
| DE | 84 19 950 U1 | 9/1984 |
| DE | 36 40 302 A1 | 6/1987 |
| DE | 38 33 494 A1 | 4/1990 |
| DE | 44 17 094 A1 | 11/1995 |
| DE | 43 33 197 C2 | 2/1999 |
| DE | 601 03 509 T2 | 6/2005 |
| GB | 1 430 086 A | 3/1976 |
| GB | 2 166 221 A | 4/1986 |

OTHER PUBLICATIONS

Search Report for DE202013103967.5 (mailed Feb. 10, 2014).

* cited by examiner

*Primary Examiner* — Matthew W Jellett
(74) *Attorney, Agent, or Firm* — Klarquist Sparkman, LLP

(57) ABSTRACT

The invention relates to a rotary slide valve comprising a housing, a valve slide, a valve seat having a sealing surface, against which the valve slide rests and in which a flow opening is provided, which has a curved outer contour at least in substantial parts, wherein the valve slide can be pivoted about an axis that is eccentric to the center of curvature of the outer contour on the side of the center of curvature that faces away from the flow opening, and a drive that can adjust the valve slide between a closed position and an open position.

14 Claims, 14 Drawing Sheets

ROTARY SLIDE VALVE

CROSS REFERENCE TO RELATED APPLICATION

The present application claims priority from pending German Patent Application No. 202013103967.5, filed Sep. 3, 2013, which is incorporated herein by reference.

The invention relates to a rotary slide valve that is preferably actuated by electromotive means and can be used in particular, but not exclusively, as a gas valve.

Many different embodiments of rotary slide valves are known from the prior art. What all embodiments have in common is that a rotary or valve slide is used that can be adjusted about a rotary axis. A flow opening will be closed or opened to a greater or lesser degree as a function of the position of the valve slide. The flow direction of the medium controlled by the rotary slide valve is, in the region of the valve slide, substantially perpendicular to the plane in which it is adjusted, i.e., parallel to the rotary axis.

Modern rotary slide valves are to meet two important requirements: on the one hand, they are supposed to be compact, i.e., they should have a profile as small as possible in relation to the maximum flow cross-section in the region of the valve slide, and at the same time low pressure losses are to be ensured, and on the other hand, a good control response should be possible, i.e., it is desired for the valve to have a valve characteristic that initially rises with a very low gradient and then runs as linear as possible.

It is the object of the invention to provide a rotary slide valve that meets these requirements as optimally as possible.

In order to achieve this object, according to the invention, a rotary slide valve is provided comprising a housing, a valve slide, a valve seat having a sealing surface, against which the valve slide rests and in which a flow opening is provided that has a curved outer contour at least in essential parts, wherein the valve slide can be pivoted about an axis that extends eccentrically to the center of curvature of the outer contour on the side of the center of curvature that faces away from the flow opening, and a drive that can adjust the valve slide between a closed position and an open position. Due to the eccentric arrangement of the rotary axis of the valve slide, a maximum flow opening can be achieved that is very large compared to the installation space that is required for the valve seat and the valve slide. In particular, a flow opening can be achieved, the area of which is more than 50% of the area of the circle that is occupied or swept by the valve slide. Further, a very good control response with a valve characteristic that is linear over long sections can be achieved.

According to one embodiment of the invention it is provided for the flow opening to be approximately semi-circular. In this way, a flow cross-section can be achieved that is very large in relation to the external dimensions.

According to a preferred embodiment of the invention it is provided for the flow opening to have the shape of a section of an annulus, the height of which is at least in the order of magnitude of the radius of the circle it is based on and is in particular greater than the radius of the circle it is based on. In other words: the outer circumference of the circle of the flow opening extends over an angular range in the order of magnitude of approximately 180° or more. In this way, a valve characteristic can be achieved that is linear over a very long section, since the change of the released flow opening is proportional to the adjustment of the valve slide.

According to a preferred embodiment of the invention it is provided for the flow opening to be substantially of the same size in the area of the sealing surface as a passage opening on the side of the valve seat that faces away from the sealing surface. In other words, the area within the valve seat through which flow occurs is almost constant in the axial direction, i.e., in the flow direction, as a result of which low losses and a high flow rate are achieved.

Preferably, the cross-section of the passage opening has the shape of a segment of a circle. This means that the shape of the passage opening corresponds to the shape of the usual ports of the rotary slide valve, so that here, too, optimal flow conditions are achieved.

It is preferably provided for the valve seat to include a recess in the sealing surface, in order to reduce the contact surface with the valve slide. Although in theory the frictional force is independent of the surface area over which contact between two components is made, but in practice it can be shown that in the case of quite smooth surfaces, as they are present on the sealing surface and on the valve slide, adhesion forces occur which can be reduced if the valve seat is provided with one or more recesses. Moreover, the adhesion of the valve seat to the sealing surface, which can be observed after longer periods of idle time of the valve in the closed condition, is advantageously reduced.

According to one embodiment of the invention, the valve seat is implemented as an insert that is received in a receptacle in the housing. On the one hand, the advantage of this is that the valve seat can, if necessary, be replaced with a new one with little effort, on the other hand the advantage is achieved that different kinds of valve seats, which differ in particular in respect of their nominal width, can be attached to one and the same type of housing.

It is preferably provided for the valve seat to have an anti-turn mechanism in order to ensure that it remains in the housing in the correct position. The anti-turn mechanism may for example be achieved by way of a flattening, so that a torque-resistant connection between the housing and the valve seat is ensured.

According to one embodiment of the invention it is provided for the valve seat to be made of ceramic. This allows it to be manufactured as a wear-resistant component with low tolerances and a high surface quality. Alternatively, the valve seat could also be made from a hard metal.

It is preferably provided for the valve slide to have the general shape of a segment of a circle in a plane perpendicular to its rotary axis. In this way, the valve slide can cooperate with a flow opening that extends over a large surface area.

It is preferably provided for the height of the segment of a circle to be greater than the radius of the circle it is based on. This is also advantageous insofar as the valve slide can reliably close and open a flow opening that is very large in relation to the surface swept by the valve slide.

According to a preferred embodiment of the invention it is provided for the rotary axis of the valve slide to be located within the segment of a circle. This ensures that the valve slide will completely sweep the flow opening in spite of it being provided eccentrically in relation to its rotary axis.

It is preferably provided for the offset between the center of curvature of the outer contour and the rotary axis of the valve slide to be in the order of magnitude of 0.05 d to 0.8 d, preferably in the order of magnitude of 0.1 d to 0.3 d, with d being the external diameter of the flow opening. The term "outer diameter" as used here is to be understood to mean the maximum dimension of the flow opening, i.e., for example in the case of a semi-circular flow opening, the diameter of the circle defined by the flow opening. The same applies to a flow opening shaped as a ring section.

According to one embodiment of the invention, a spring is provided which urges the valve slide in an axial direction against the valve seat. Such a spring ensures a good sealing of the valve slide against the sealing surface.

The invention will be described below by means of two embodiments which are illustrated in the attached drawings, wherein.

Figure 1:
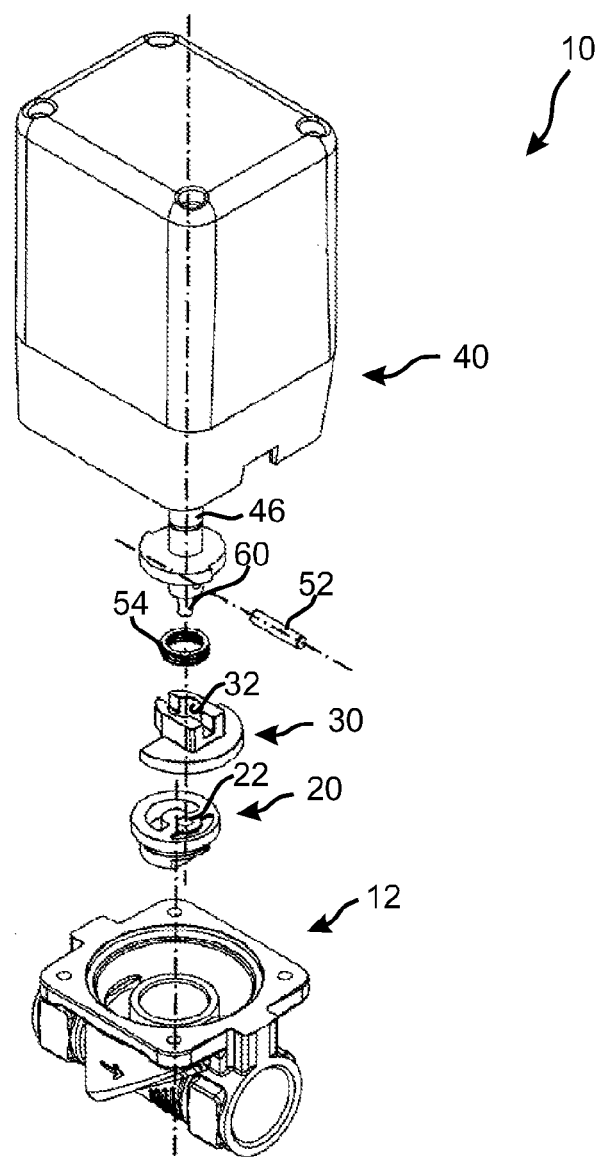
FIG. 1 shows an exploded view of a rotary slide valve according to a first embodiment.

In FIG. 1, a rotary slide valve 10 according to a first embodiment is shown, which comprises as essential components a port housing 12, a valve seat 20, a valve slide 30, and a drive 40.

Figure 2:
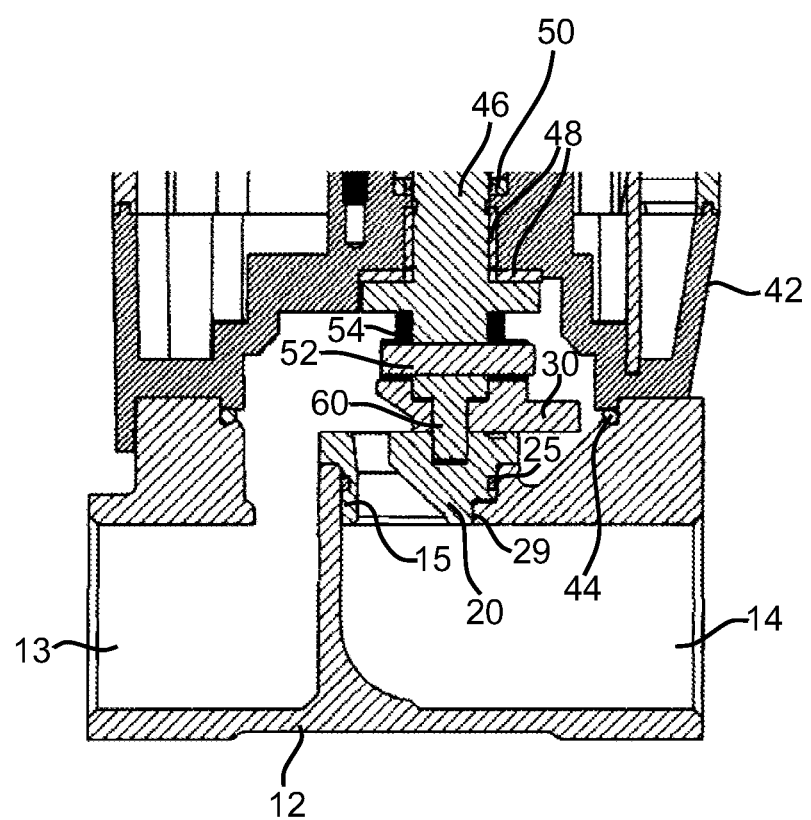
FIG. 2 shows a section through the rotary slide valve of FIG. 1 in the region of the valve seat and of the valve slide.

The port housing 12 (see also FIG. 2) includes an inlet 13 and an outlet 14. Between the inlet 13 and the outlet 14, a receptacle 15 for the valve seat 20 is provided.

Attached to the port housing 12 is a drive housing 42 of the drive 40. A sealing ring 44 is provided for sealing.

In the drive housing 42, an actuator (not shown here in any more detail) is provided, by means of which a drive shaft 46 can be turned in a controlled manner. The drive shaft 46 is supported in the drive housing 42 by supports 48 and seals 50, which are only indicated here.

The valve slide 30 is coupled to the drive shaft 46 in a rotationally fixed manner. To this end, a driver pin 52 is provided here, which extends through an opening in the drive shaft 46 and is received in a driver recess 32 of the valve slide 30.

A spring 54 is provided on the drive shaft 46, which urges the valve slide 30 away from the drive housing 42 against the valve seat 20. The spring 54 is preferably implemented as a wave spring, so that a low design profile is made possible.

The drive shaft 46 is provided with a projection 60 that extends through the valve slide 30 and engages in a support opening 22 in the valve seat 20. In this way, the valve slide 30 is precisely supported relative to the valve seat 20.

Deviating from the embodiment shown, also other types of rotationally fixed connections between the drive shaft 46 and the valve slide 30 may be used. It is not necessary either for the drive shaft 46 to completely extend through the valve slide 30 and engage in the valve seat 20. Finally it is to be noted that the inlet and the outlet of the rotary slide valve may also be interchanged, so that the medium to be switched or to be controlled can flow through the opening 14 into the port housing 12 and can exit it through the opening 13.

Figure 3:
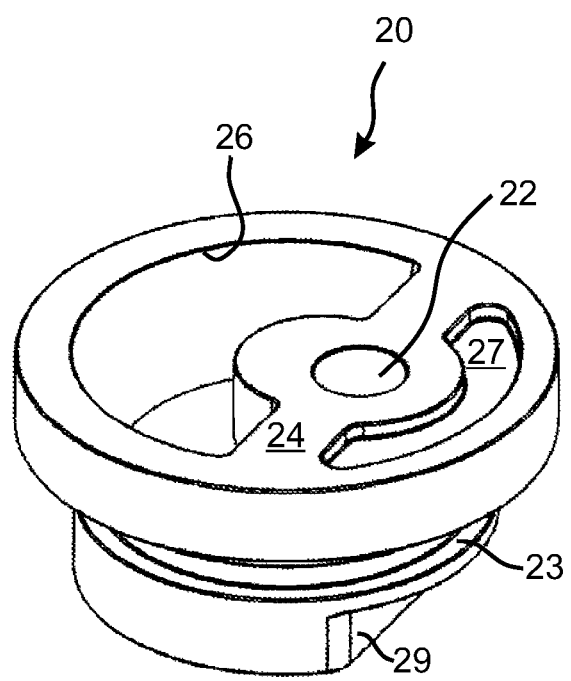
FIG. 3 shows the valve seat used in the rotary slide valve of FIG. 1 in a perspective view.
Figure 4:
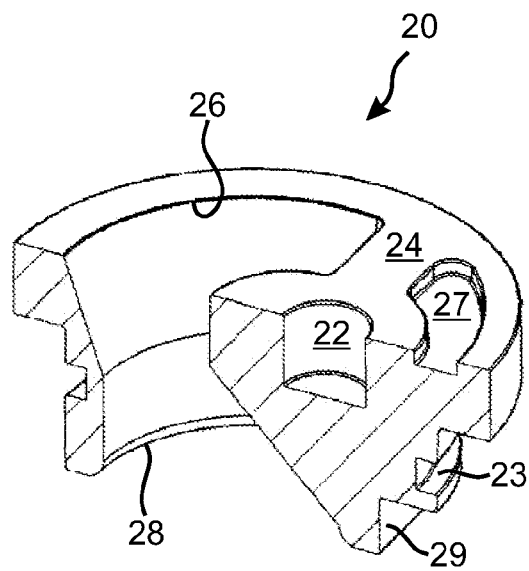
FIG. 4 shows a section through the valve seat of FIG. 3.

The valve seat 20 is shown in detail in FIGS. 3 and 4. It includes a sealing surface 24, which is the surface against which the valve slide 30 rests.

The sealing surface 24 has a flow opening 26 provided therein, which is the opening that controls, in cooperation with the valve slide 30, the available flow cross-section. The flow opening 26 has here the shape of a section of an annulus, the height of which corresponds to the order of magnitude of the radius of the circle that the annulus is based on. Both the outer contour and the inner contour, i.e., the smaller radius, of the shaped flow opening 26 in the shape of a section of an annulus are concentrically arranged, namely about a common center M (see FIG. 17). The two boundaries of the at least approximately semi-circular outer contour and the at least approximately semi-circular inner contour of the flow opening 26 are aligned to be co-linear.

Further, in the area of the flow opening 26, a recess 27 is provided, the function of which consists in reducing the contact surface with the valve slide 30 and any adhesion acting therewith.

Figure 5:
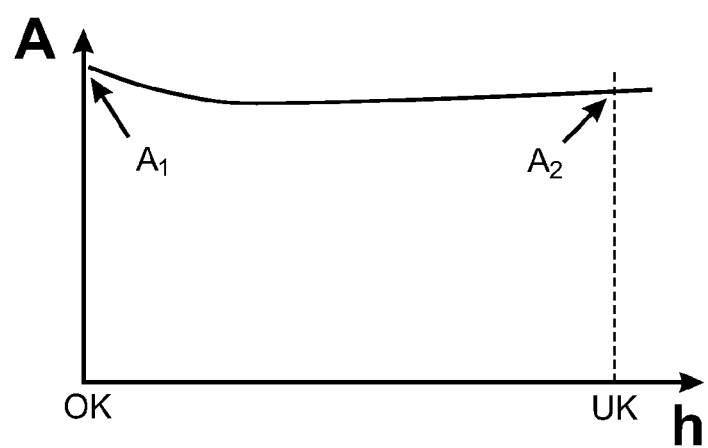
FIG. 5 shows a graph of the free flow cross-section through the valve seat depending from the respective position within the valve.

On the side facing away from the sealing surface 24, a passage opening 28 is provided in the valve seat, the cross-section of which has the shape of a circular section. The cross-section of the passage opening 28 is substantially of the same size as the cross-section of the flow opening 26. The magnitude of the overall flow cross-section through the valve seat 20 is shown in FIG. 5, where it says "OK" for the top edge (in relation to the orientation in FIGS. 2 to 4), i.e., ultimately the sealing surface 24, and "UK" for the bottom edge of the valve seat. It can be seen that the overall flow cross-section initially diminishes by a minimal degree from the top towards the bottom and then remains substantially constant.

On the outside of the valve seat 20, a groove 23 is provided in which a sealing ring 25 (see FIG. 2) may be disposed, as well as an anti-turn mechanism in the form of a flattening 29 that cooperates with a corresponding surface in the port housing 12. This ensures that the valve seat 20 can be mounted in the receptacle 15 exclusively in the one correct position.

The valve seat is preferably made of ceramic, so that it has precise dimensions and at the same time a high surface quality, and moreover a good sealing response with the valve slide 30 is achieved. Alternative materials for the valve seat 20 are aluminium oxide and zirconium oxide or zirconium dioxide or a hard metal.

In order to reduce flow losses, all the edges in the area of the passage opening 28 have been rounded.

Figure 6:
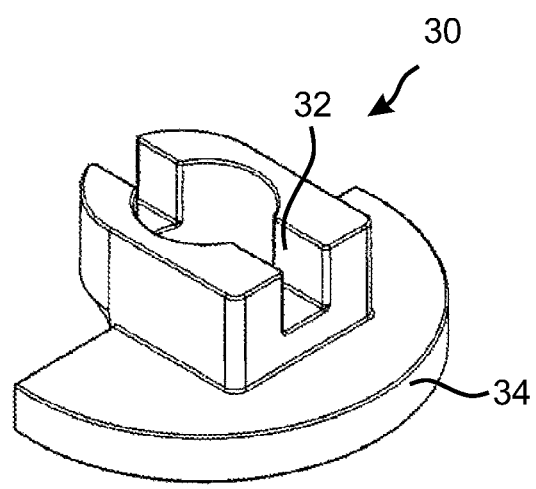
FIG. 6 shows a first perspective view of the valve slide used in the rotary slide valve of FIG. 1.
Figure 7:
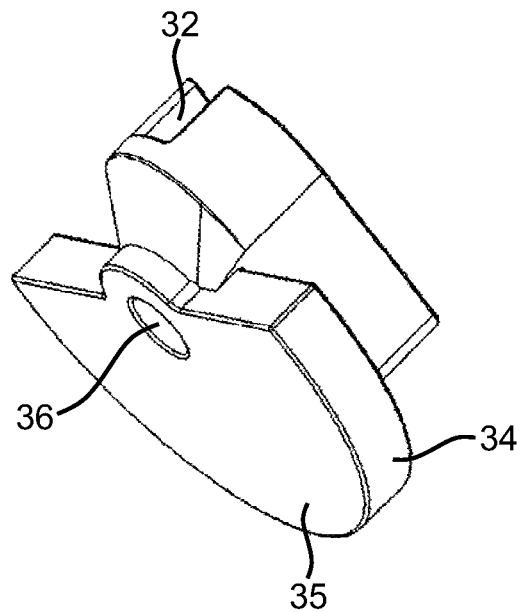
FIG. 7 shows a second perspective view of the valve slide.

The valve slide 30 (see in particular FIGS. 6 and 7) has a disc-shaped sealing section 34, the bottom surface 35 of which cooperates with the sealing surface 24 of the valve seat 20.

The sealing section 34 has here the shape of a segment of a circle, and the height of the segment of a circle is greater than the radius of the circle the segment of a circle is based on. In other words, the curved outer contour of the sealing section 34 extends over slightly more than 180°. This allows the center of curvature of the outer contour and also the opening 36, through which the projection 60 of the drive shaft 46 extends that is used as the bearing pin, are located within the circular segment.

With regard to the dimensions of the valve slide it is provided for the radius of the circle that the segment of a circle is based on, which describes the shape of the valve slide 30 in a plane perpendicular to its rotary axis, to be greater than the distance between the center of the support opening 22 and the external outer contour of the flow opening 26 of the valve seat 20. This ensures that the valve slide 20 covers the flow opening 26 in any position, so that the flow is controlled by the interaction between the flow opening 26 and the sections of the sealing section 34 that are located on the chord (and not on the circular arc of the circular segment).

The valve slide 30 can also be made of ceramic. Further suitable materials for the valve slide 30 are aluminium oxide, zirconium oxide and zirconium dioxide. The valve slide 30 has, like the valve seat 20, precise dimensions and at the same time a high surface quality.

Figure 8:
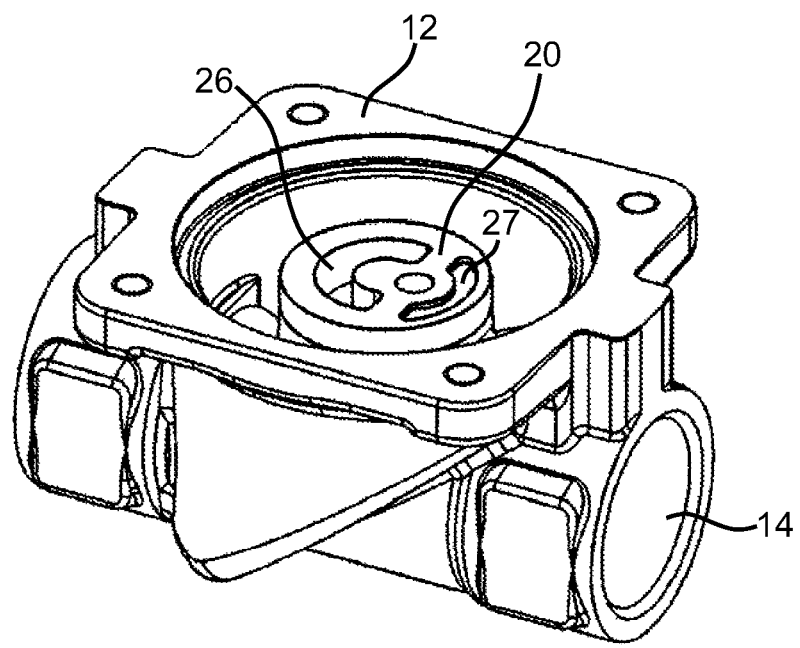
FIG. 8 shows a perspective view of the valve seat mounted in the port section of the valve housing.
Figure 9:
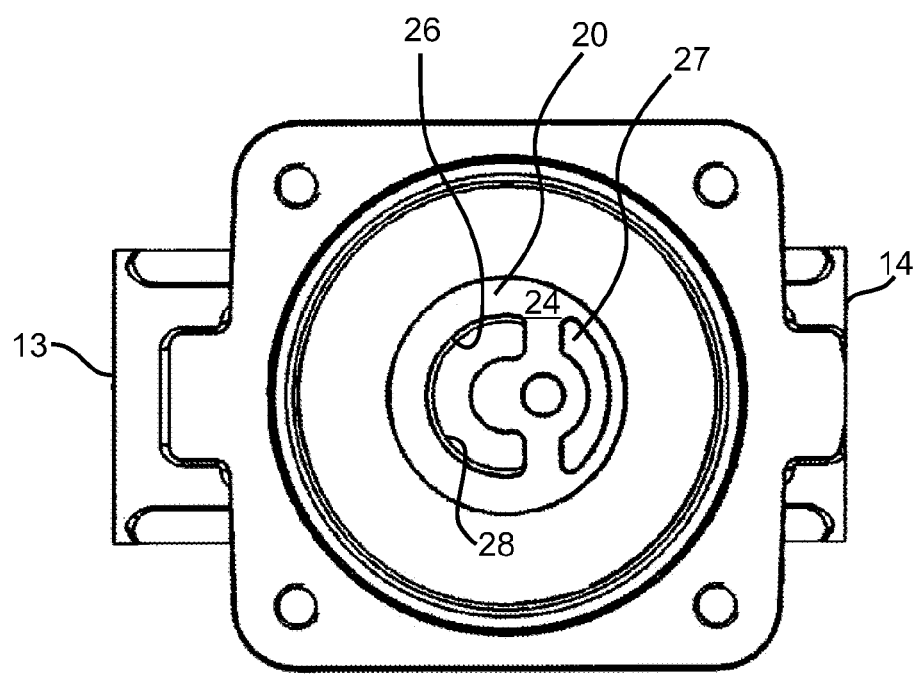
FIG. 9 shows the port section of the valve housing with a mounted valve seat in a top view.

FIG. 8 shows the port housing 12 with the valve seat inserted therein. What can also be seen is the flow opening 26 which leads to the passage opening 28 therebelow (see also FIG. 9).

In the mounted condition of the rotary slide valve 10, the sealing section 34 of the valve slide 30 rests on the valve seat 20. This will be closed or opened to a greater or lesser degree as a function of the position of the valve slide 30 relative to the flow opening 26.

In FIGS. 10 to 17, a second embodiment is shown which differs from the first embodiment in that a greater flow and a greater nominal width are provided. Further, the two circular contours of the flow openings are not concentric. With regard to the basic mode of functioning, however, the second embodiment corresponds to the first embodiment.

Figure 10:
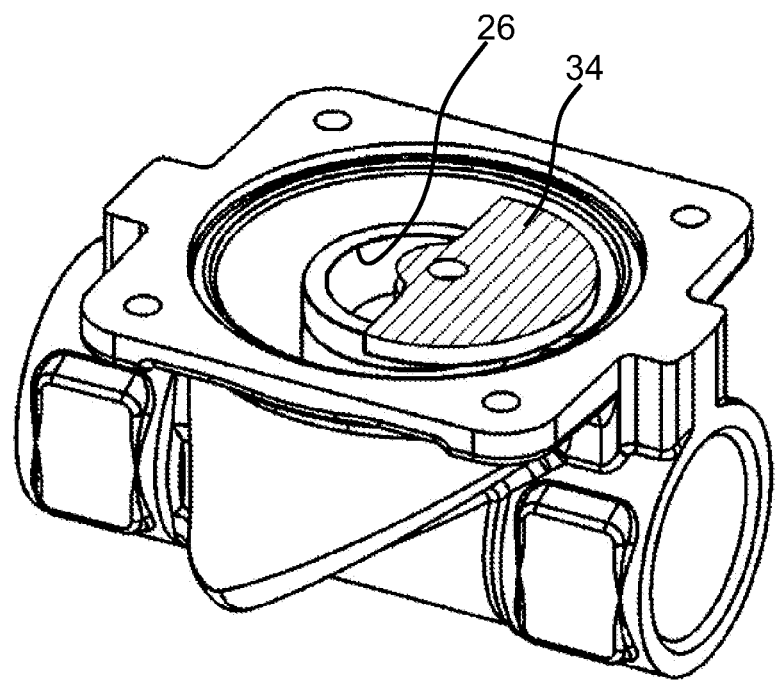
FIG. 10 shows a view corresponding to that of FIG. 8 of the valve seat of a rotary slide valve according to a second embodiment with an attached valve seat, which is shown sectioned.

Also in the case of the second embodiment, in the mounted condition of the rotary slide valve 10, the sealing section 34 of the valve slide 30 rests on the valve seat 20 (see FIG. 10). This will be closed or opened to a greater or lesser degree as a function of the position of the valve slide 30 relative to the flow opening 26.

Figure 11:
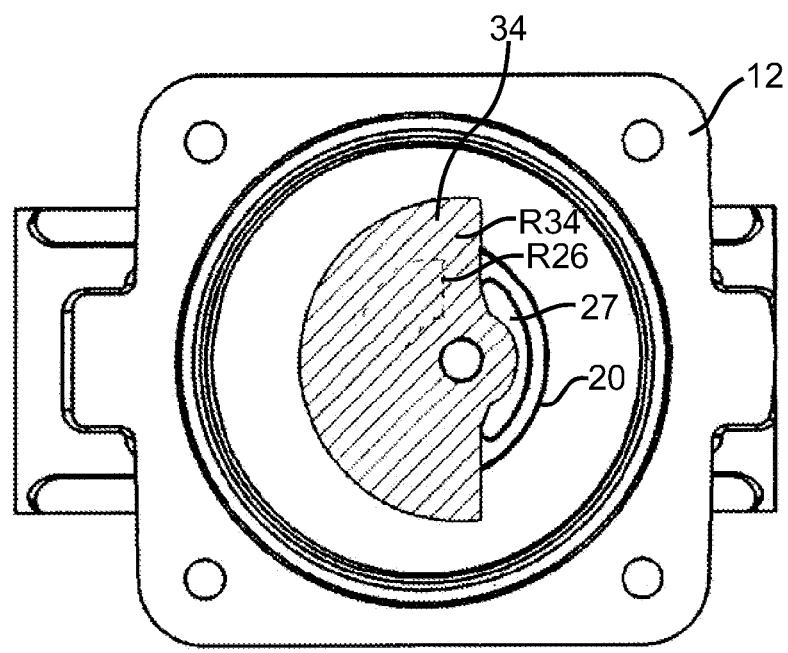
FIG. 11 shows a top view of the valve seat of FIG. 10, mounted in the port section of the housing with a valve slide, which is shown sectioned and in the closed position.

In FIG. 11, the rotary slide valve is shown in the position in which the flow opening 26 is completely closed. This means that the sealing section 34 of the valve slide 30 completely covers the flow opening 26.

Figure 12:
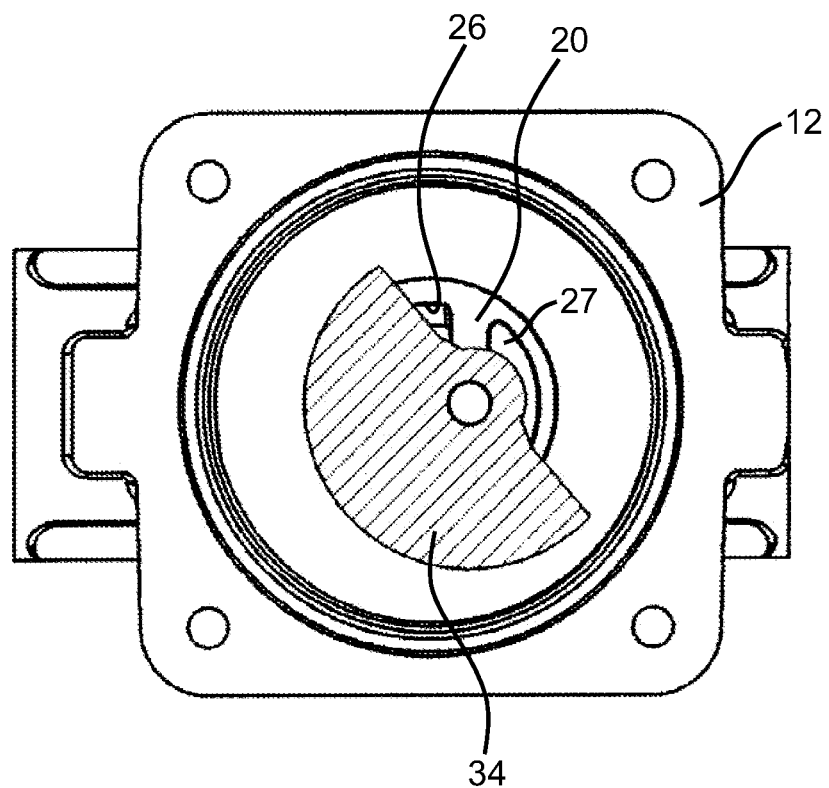
FIG. 12 shows a view corresponding to that of FIG. 11 of the rotary slide valve with a slightly opened valve slide.

In FIG. 12, the rotary slide valve is shown in a slightly open position. It can be seen that only a small, approximately triangular cross-section of the flow opening 26 is open. This can be attributed to the fact that the center of curvature M is arranged to be eccentrical about a distance e relative to the center of the drive shaft 46, i.e., is offset from the center of curvature M. In this respect, the drive shaft 46 is located on the side of the center of curvature M that faces away from the flow opening 26. Due to the eccentric arrangement of the rotary axis of the valve slide 30 relative to the center of curvature of the outer contour and the inner contour of the flow opening 26, and moreover due to the fact that in the completely closed position of the rotary slide valve, the edges of the flow opening 26, which are parallel to each other (see the edge R26 as indicated in FIG. 11) and the edge of the sealing section 34 (in FIG. 11 referred to as R34), are located at a distance from each other, the edge R34 is turned about a certain angle before it enters the region of the flow opening 26. As a result, the flow opening 26 is initially opened in an external corner, which leads to a very slight upward gradient of the valve characteristic (see FIG. 16) between the completely closed position of FIG. 11 and the slightly open position of FIG. 12.

A linear valve characteristic (see FIG. 15) will not be achieved until the edge R34 reaches the curved inner contour of the flow opening 26.

Figure 13:
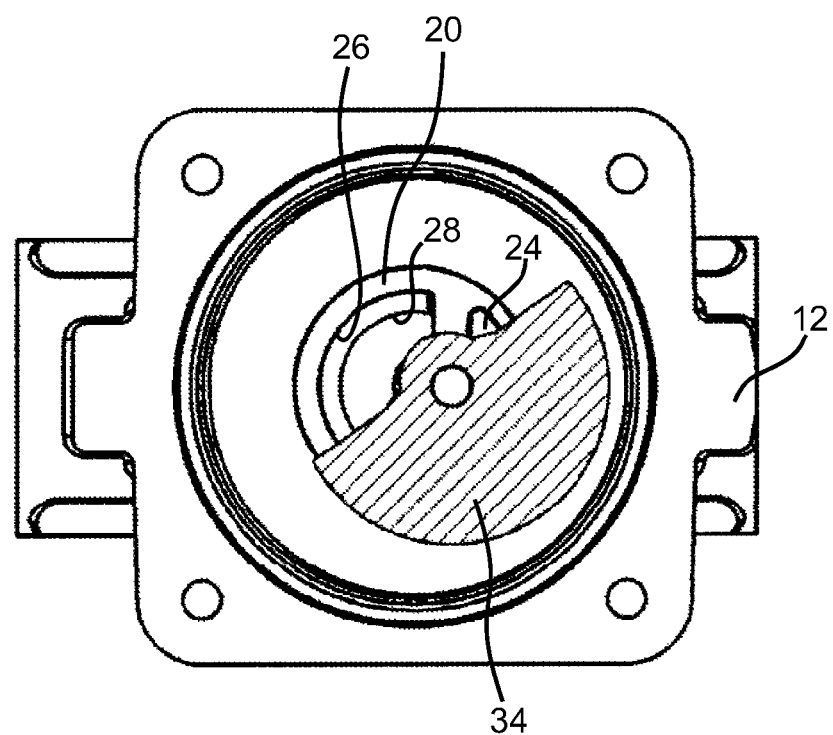
FIG. 13 shows a view corresponding to that of FIG. 12, wherein the valve slide is opened even further.

In FIG. 13 it can be readily seen with regard to the valve slide 30, which is in a rather wide open position, that the regions of the sealing surface 24, which are located on the side of the recess 26 that faces away from the support opening 22, are used as additional support surfaces for the sealing section 34 of the valve slide 30.

Figure 14:
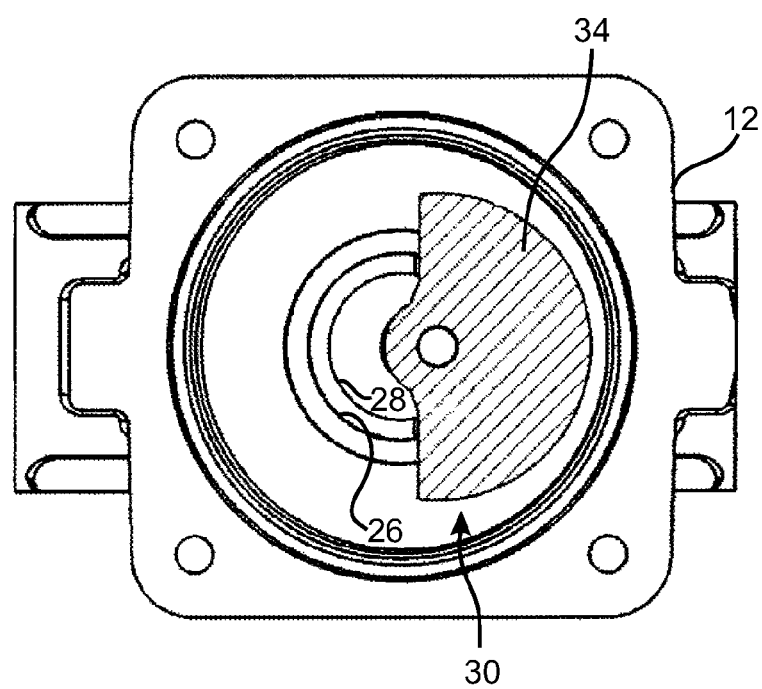
FIG. 14 shows a view corresponding to that of FIG. 13, wherein the valve slide is located in a completely opened position.
Figure 16:
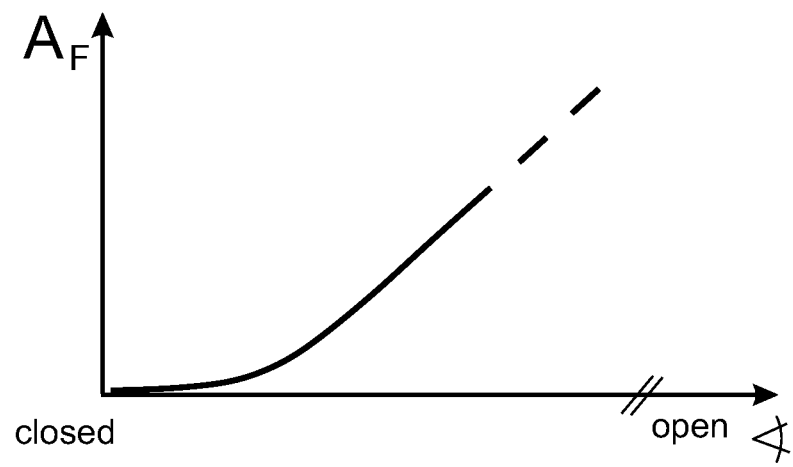
FIG. 16 shows an enlarged view of the valve characteristic for very small opening cross-sections.
Figure 15:
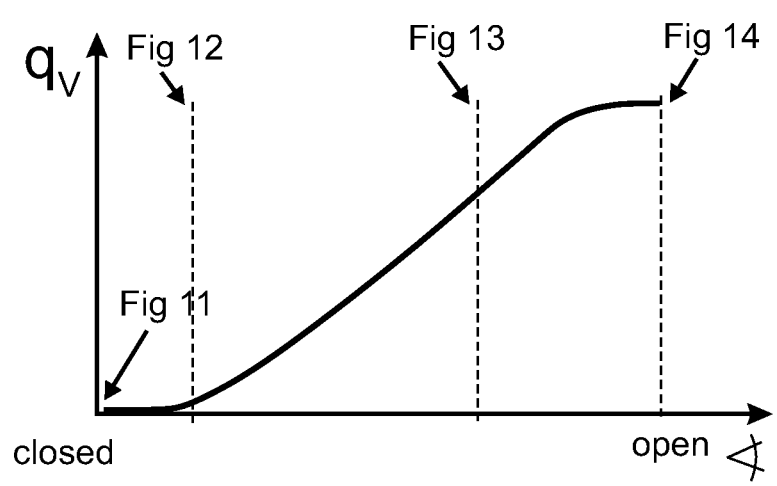
FIG. 15 shows the valve characteristic of the rotary slide valve, wherein the flow cross-sections are marked with the positions of the valve slide as shown in FIGS. 11 to 14.

In FIG. 14, the valve slide 30 is shown in a completely open position. It can be seen that the flow opening 26 is completely open.

The eccentricity e, about which the central axis of the drive shaft 46 is offset relative to the center of curvature M of the flow opening 26, is in the order of magnitude of 0.1 to 0.3 d, with d being the outer diameter of the flow opening 26.

Figure 17:
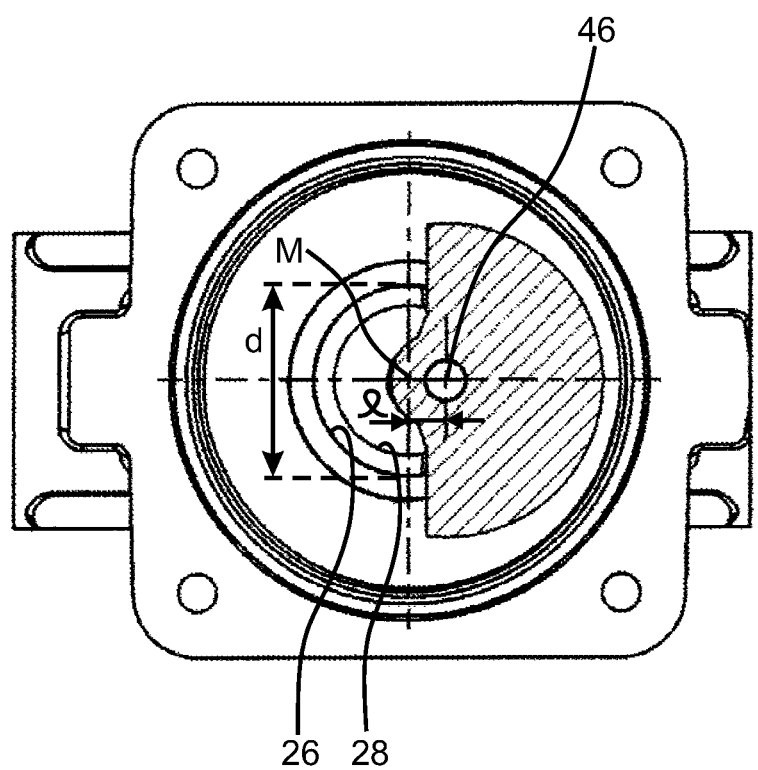
FIG. 17 shows a view corresponding to that of FIG. 14 for an embodiment variant, wherein the rotary axis of the valve slide is shown relative to the flow opening.

The embodiment variant shown in FIG. 17 differs from the previous embodiment in respect of the flow cross-section. Whilst in the previous embodiment, the "nose" reduces the flow opening, FIG. 17 shows a valve with a second valve seat having a greater nominal width/a larger flow opening. The "nose" protrudes less far into the flow opening and the circles are not concentric. Moreover, the sealing edge is narrower.

The invention claimed is:

1. A rotary slide valve comprising a housing, a valve slide, a valve seat having a sealing surface against which the valve slide rests and in which a flow opening is provided that has a curved outer contour, wherein the valve slide is pivotable about an axis that is eccentric relative to a center of curvature of the curved outer contour on a side of the center of curvature that faces away from the flow opening, and a drive adapted for adjusting the valve slide between a closed position and an open position, wherein the flow opening has a shape of a section of an annulus, and the curved outer contour extends over an angle that is greater than 180 degrees such that the curved outer contour has a height greater than a radius of a circle on which it is based.

2. The rotary slide valve of claim 1, wherein in an area of the sealing surface, the flow opening is substantially of the same size as a passage opening on the side of the valve seat that faces away from the sealing surface.

3. The rotary slide valve of claim 2, wherein a cross-section of the passage opening has the shape of a segment of a circle.

4. The rotary slide valve of claim 1, wherein the valve seat has a recess in the sealing surface thereby reducing contact surface with the valve slide.

5. The rotary slide valve of claim 1, wherein the valve seat is implemented as an insert that is received in a receptacle in the housing.

6. The rotary slide valve of claim 5, wherein the valve seat includes an anti-turn mechanism to secure the valve seat position in the housing.

7. The rotary slide valve of claim 1, wherein the valve seat is made of ceramic.

8. The rotary slide valve of claim 1, wherein the valve slide has, in a plane perpendicular to its rotary axis, the shape of a segment of a circle.

9. The rotary slide valve of claim 8, wherein the segment of the circle has a height, and the height of the segment of the circle is greater than a radius of the circle on which it is based.

10. The rotary slide valve of claim 9, wherein the radius of the circle that the segment of a circle is based, which describes the shape of the valve slide in a plane perpendicular to its rotary axis, is greater than the distance between the center of the support opening and the outer contour of the flow opening of the valve seat.

11. The rotary slide valve of claim 8, wherein the rotary axis of the valve slide is located within the segment of the circle on which it is based.

12. The rotary slide valve of claim 1, wherein an offset between the center of curvature of the curved outer contour and the rotary axis of the valve slide is from about 0.05 d to about 0.8 d, with d being an outer diameter of the flow opening.

13. The rotary slide of claim 1, further comprising a spring that urges the valve slide in an axial direction against the valve seat.

14. The rotary slide valve of claim 1, wherein the flow opening is approximately semi-circular.

\* \* \* \* \*